Patented Apr. 1, 1941

2,236,523

UNITED STATES PATENT OFFICE 2,236,523

CELLULOSE ETHERS

Cole Coolidge, Wilmington, Del., assignor to E. I. du Pont de Nemours & Company, Wilmington, Del., a corporation of Delaware No Drawing. Application October 3, 1939, Serial No. 297,661

3 Claims. (Cl. 260—231)

This invention relates to the manufacture of cellulose ethers having a low degree of substitution and a high degree of uniformity, and more particularly, to the production of low substituted cellulose ethers having good solubility and high quality.

Since 1916, when the first U. S. A. patent (1,188,376) on cellulose ether manufacture was taken out, the constant endeavor of a multitude of workers in this art has been to secure a more uniform product. Many procedures directed to this end have been devised and patented. It is a fact, however, that up to the present time no completely satisfactory process employing etherifying agents which are liquid (or solid) at the temperatures permissible for low substitution etherification reactions, has been evolved.

Because of the detrimental effect of elevated temperatures, the cost of etherifying agents and other such controlling factors, the manufacture of low substituted cellulose ethers is usually carried out at temperatures approximating ordinary room temperature with very small proportions (relative to the cellulose of etherifying agents. These previously preferred procedures necessitated the use of powerful mixing devices.

This invention had for an object the provision of a new technique for the manufacture of low substituted cellulose ethers. Another object was to produce low substituted cellulose ethers of a high degree of uniformity and unusually high quality. Another object was to overcome the disadvantages encountered in manufacturing low substituted cellulose ethers with non-volatile etherifying agents. Still further objects were to manufacture low substituted cellulose ethers of good solubility without the use of excessive quantities of reagent (which lowers the wet strength of the material) and without degrading the cellulose excessively (which reduces the wet strength and harmfully affects the toughness of the product), and to avoid the use of expensive manufacturing equipment. A general advance in the art, and other objects which will appear hereinafter, are also contemplated.

It has now been found that very superior low substituted cellulose ethers can be produced by introducing the etherifying agent in a fine mist into the alkali cellulose etherification mixture while the same is being mixed or tumbled. It is astonishing that low substituted cellulose ethers of good quality could be obtained in such a manner. The shredded alkali cellulose customarily employed in the manufacture of this type of product is in the form of fairly dense crumbs, and their easy penetration by a non-volatile or slightly volatile etherifying agent without vigorous mechanical mixing is amazing. Following the introduction of the etherifying agent, etherification can be continued in the usual manner, depending upon the nature of the cellulose derivative being prepared.

From the following description and specific examples, in which are disclosed certain embodiments of the invention as well as details of what is believed to be the best mode for carrying out the invention, it will be apparent how the foregoing objects and related ends are accomplished. The parts are given by weight throughout the application.

Example I

Two hundred (200) pounds of cellulose in sheet form, prepared by the sulfite process, were steeped in 2,000 pounds of 25% aqueous sodium hydroxide for one hour. The sheets were then pressed to 600 parts by weight and shredded for one hour in a Werner-Pfleiderer shredder. The cover of the shredder was then tightly sealed, and 41 pounds (0.263 mol.) of dimethyl sulfate sprayed as a mist into the shredder through a manifold system containing 6 atomizing nozzles. The dimethyl sulfate was forced through the nozzles by nitrogen pressure. The time required for the addition was about 20 minutes, and during this time the shredder was run as rapidly as possible. The shredding was continued for two hours more at 25° C., after which the reaction mixture was placed in aging boxes and allowed to remain for 40 hours at 25° C. The product, after washing with water (to remove by-product sodium sulfate, sodium methyl sulfate and excess caustic) could be dissolved in 7% aqueous sodium hydroxide at 0° C. to give a high viscosity solution containing very little undissolved fiber. The solution when spread in thin layers and introduced into an acid bath, coagulated into transparent sheets which had good strength in the coagulating bath, and which after drying were of good wet strength. The methyl cellulose was in all respects a superior type of product.

To prepare a product of comparable solubility by the procedures heretofore practiced would require at least 25% more dimethyl sulfate, and the cellulose ether so produced would have undesirably low wet strength.

Example II

A bath of alkali cellulose was prepared as described in Example I. Fifty (50) pounds of dimethyl sulfate (0.321 mol.) was introduced into the shredder through a manifold ending in 6 misting nozzles, while the reaction mixture was being vigorously agitated. Pressure was applied as described in Example I, so that the dimethyl sulfate was atomized upon leaving the nozzles, and contacted the reaction mixture in spray form. The time required for the addition was 20 minutes. The mixture was agitated for another 2 hours at 25° C., after which it was removed from the shredder and aged for 40 hours at 25° C. The product, after purification by washing with water, as described in Example I, gave a cellulose ether similar in characteristics to the product of Example I.

*Example III*

Two hundred (200) pounds of cellulose in sheet form, prepared by the sulfite process, were steeped in 2,000 pounds of 25% aqueous sodium hydroxide for 1 hour. The sheets were then pressed to 600 parts by weight and shredded for 1 hour in a Werner-Pfleiderer shredder. The cover of the shredder was then tightly sealed and 41 pounds (0.306 mol.) of methyl chloroacetate (in the form of a 50% solution in benzene) sprayed as a mist into the shredder through a manifold system containing 6 atomizing nozzles. The etherifying agent solution was forced through nozzles by nitrogen pressure. The time required for the addition was about 20 minutes, and during this time the shredder was run as rapidly as possible. The shredding was continued for 2 hours more at 25° C., after which the reaction mixture was placed in aging boxes and allowed to remain for 40 hours at 25° C. The product, after washing with water (to remove by-product materials, caustic soda, etc.) could be dissolved in 7% aqueous sodium hydroxide at 0° C. to give a high viscosity solution containing very little undissolved fiber. The solution, when spread in thin layers and introduced into an acid bath, coagulated into transparent sheets which had good strength in the coagulating bath, and which after drying were of good wet strength (when rewet). The cellulose glycolic acid was in all respects a superior type of product. The sodium cellulose glycolate produced according to this example gave solutions of excellent solubility in the 7% aqueous sodium hydroxide at 0° C.

It is possible to use a saturated solution of sodium chloroacetate in water or a solution of chloroacetamide in ethyl alcohol as the etherifying reagent.

*Example IV*

Two hundred (200) pounds of cellulose in sheet form, prepared by the sulfite process, were steeped in 2,000 pounds of 25% aqueous sodium hydroxide for 1 hour. The sheets were then pressed to 600 parts by weight, and shredded for 1 hour in a Werner-Pfleiderer shredder. The cover of the shredder was then tightly sealed and 0.25 mol. (25 pounds) ethylene chlorohydrin sprayed as a mist into the shredder through a manifold system containing 6 atomizing nozzles. The ethylene chlorohydrin was forced through the nozzles by nitrogen pressure. The time required for the addition was about 20 minutes and during this time the shredder was run as rapidly as possible. The shredding was continued for 2 hours more at 25° C., after which the reaction mixture was placed in aging boxes and allowed to remain for 40 hours at 25° C. The product, after washing with water (to remove by-product materials and caustic soda) could be dissolved in 7% aqueous sodium hydroxide at 0° C. to give a high viscosity solution containing very little undissolved fiber. The solution, when spread in thin layers and introduced into an acid bath, coagulated into transparent sheets which had good strength in the coagulating bath, and which after drying were of good wet strength (when rewet). The glycol cellulose was in all respects a superior type of product. The glycol cellulose had excellent solubility in 9% aqueous caustic soda solution at room temperature. Such solutions were decidedly superior in quality to corresponding solutions of glycol cellulose made by pouring ethylene chlorohydrin into alkali cellulose in a shredder.

*Example V*

Two hundred (200) pounds of cellulose in sheet form, prepared by the sulfite process, were steeped in 2,000 pounds of 25% aqueous sodium hydroxide for 1 hour. The sheets were then pressed to 600 parts by weight and shredded for 1 hour in a Werner-Pfleiderer shredder. The cover of the shredder was then tightly sealed, and 41 pounds (0.215 mol.) of diethyl sulfate sprayed as a mist into the shredder through a manifold system containing 6 atomizing nozzles. The diethyl sulfate was forced through nozzles by nitrogen pressure. The time required for the addition was about 20 minutes, and during this time the shredder was run as rapidly as possible. The shredding was continued for 2 hours more at 25° C., after which the reaction mixture was placed in aging boxes and allowed to remain for 72 hours at 25° C. The product, after washing with water (to remove by-product sodium sulfate, sodium ethyl sulfate and excess caustic), could be dissolved in 7% aqueous sodium hydroxide at 0° C. to give a high viscosity solution containing very little undissolved fiber. The solution when spread in thin layers and introduced into an acid bath, coagulated into transparent sheets which had good strength in the coagulating bath, and which after drying were of good wet strength (when rewet). The ethyl cellulose was in all respects a superior type of product. The process outlined above in this example is one of the most satisfactory found up to the present time for the preparation of mixed cellulose ethers and cellulose ether esters.

*Example VI*

Three hunderd (300) parts of alkali cellulose were made by steeping 120 parts of wood pulp cellulose in 1200 parts of 21% aqueous sodium hydroxide and pressing. The alkali cellulose was then shredded at room temperature and placed in a tumbling vessel rotating at about 5 R.P.M. During this rotation 51 parts (0.546 mol.) of dimethyl sulfate were sprayed into the apparatus. This was accomplished by using an atomizing nozzle which caused the dimethyl sulfate particles to be broken into a fine mist by the action of air. The time required for the introduction of the dimethyl sulfate was about 30 minutes. The mixture was then tumbled for another 1¼ hours. The product was then aged at 30° C. for 16 hours, after which it was washed free from alkali. A 5% solution of this methyl cellulose in 5% aqueous sodium hydroxide (made by cooling a slurry to the freezing point and allowing the resultant solution to come back to room temperature) was of good quality and suitable for the sizing of textiles.

*Example VII*

Three hundred (300) parts of alkali cellulose were made by steeping 120 parts of wood pulp cellulose in 1200 parts of 21% aqueous sodium hydroxide and pressing. The alkali cellulose was then shredded at room temperature and place in a tumbling vessel rotating at about 5 R. P. M. During this rotation 20 parts (0.214 mol.) of dimethyl sulfate were sprayed into the apparatus. This was accomplished by using an atomizing nozzle which caused the dimethyl sulfate particles to be broken into a fine mist by the action of air. The time required for the introduction of the dimethyl sulfate was about 30 minutes. The mixture was then tumbled for another 1¼ hours. The product was then aged at 30° C. for 16 hours, after which it was washed free from alkali. A 5% solution of this methyl cellulose in 5% aqueous sodium hydroxide (made by cooling a slurry to the freezing point and allowing the resultant solution to come back to room temperature) was of good quality and especially satisfactory for the permanent sizing of fabrics. The 5%–5% aqueous sodium hydroxide solutions were of high viscosity.

*Example VIII*

Three hundred (300) parts of alkali cellulose were made by steeping 120 parts of wood pulp cellulose in 1200 parts of 21% aqueous sodium hydroxide and pressing. The alkali cellulose was then shredded at room temperature and placed in a tumbling vessel rotating at about 5 R. P. M. During this rotation 25 parts of dimethyl sulfate and 10 parts diethyl sulfate were sprayed into the apparatus. This was accomplished by using an atomizing nozzle which caused the dialkyl sulfate particles to be broken into a fine mist by the action of air. The time required for the introduction of the dialkyl sulfate was about 30 minutes. The mixture was then tumbled for another 1¼ hours. The product was then aged at 30° C. for 16 hours, after which it was washed free from alkali. A 5% solution of the alkyl cellulose in 5% aqueous sodium hydroxide (made by cooling a slurry to the freezing point and allowing the resultant solution to come back to room temperature) was of good quality and suitable for the permanent sizing of textiles.

*Example IX*

Sulfite cellulose (160 parts) was steeped in 2,000 parts of 18% sodium hydroxide for one hour at 30° C. The resulting alkali cellulose was then pressed to a weight of 400 parts and shredded for one-half hour at 25° C. Thereafter, 63 parts of dimethyl sulfate (0.5 mol. per glucose unit of cellulose) were sprayed into the shredder through misting nozzles. After shredding for two more hours the reaction mixture was removed and aged for 48 hours at 25° C. Washing to produce a caustic-free product was then accomplished by drowning in a large excess of warm water, followed by rinsing until only a faint color was given by phenolphthalein. A 6% solution of the resulting ether was made in 7% caustic soda by cooling to −7° C. with good stirring. The solution was then filtered and cast into films. The resulting transparent, lustrous film was moistureproofed by coating it with the lacquer coating composition obtained by dissolving:

| | Per cent |
|---|---|
| Nitrocellulose | 56.7 |
| Dewaxed damar | 14.0 |
| Dibutyl phthalate | 23.5 |
| Paraffin wax | 4.1 |
| Zinc stearate | 1.3 | in a solvent consisting of ethyl acetate 55.1%, ethyl alcohol 3.5% and toluene 41.4%. The lacquered films could be immersed in water at room temperature for several days without the lacquer separating from the base.

*Example X*

Methyl cellulose was prepared by steeping 160 parts of air dry cotton linters for 1 hour at 25° C. in 1600 parts 18% sodium hydroxide solution, pressing to a ratio of 3, placing in a shredder and spraying in 6 parts 0.05 mols) of dimethyl sulfate in the form of a mist during the shredding operation. After the shredding was completed, the alkali (methyl) cellulose was dumped into aging cans and stored for 48 hours at 20° C. Analysis of the product showed it to contain 0.045 methyl group per glucose unit of the cellulose. The product was very uniformly etherified.

*Example XI*

One hundred and twenty-five (125) parts of sulfite wood pulp sheet, approximately 0.05 inch thick (yielding 90% alpha cellulose calculated on the dried material) in an air-dried state containing 9% moisture and cut in the form of squares ⅛ inch x ⅛ inch, were added to a solution of 45 parts of caustic soda in 180 parts of water at 20° C. contained in a jacketed Werner-Pfleiderer type shredding machine provided with a cover. The blades were set in motion, and working was continued under cover for a period of 8 hours; at the end of this period a solution of 10.5 parts (0.17 mol. per glucose unit) ethylene chlorohydrin in 24 parts of water was atomized in the form of a fine mist into the machine during a period of about 2 hours, during which time the blades of the machine continued in motion. The temperature of the mixture was maintained at or near 19° C. by circulating cold water through the jacket. Working was continued for a further two hours, in the course of which time the temperature was gradually raised to 30° C. by passing steam through the jacket. The product was aged for a week in closed iron bins in a room maintained at about 27° C. The product was then acidified with a large volume of 1% sulfuric acid and centrifuged and washed until neutral. The product was nearly insoluble in caustic soda at room temperature, that is to say, when 2 gms. were treated with 98 gms. of 10% caustic soda at 20° C., 1.25 gms. remained undissolved, and when 2 gms. were treated with 98 gms. of 5% caustic soda, 1.8 gms. remained undissolved, but dissolved completely in 7.5% sodium hydroxide solution to form a 7% solution therein when a mixture of an appropriate quantity of the said product with the sodium hydroxide solution was cooled to about −7° C. so that crystals of ice appeared, and the frozen mixture was allowed slowly to regain normal temperature. The solution so obtained was of excellent quality.

*Example XII*

One hundred and twenty-five (125) parts of dense wood pulp chips, as used in Example XI, were worked in a jacketed Werner-Pfleiderer machine with a solution of 45 parts caustic soda in 200 parts water at 20° C. for 8 hours, at the end of which period 22 parts of dimethyl sulfate were introduced in the form of a fine mist by means of an atomizer for a period of about 1 hour, during which the incorporation was continued. From the commencement of the period of introduction of the dimethyl sulfate, the reaction mixture was continuously heated by the circulation of steam through the jacket so that a temperature of 50° C. was attained on the completion of this period, and the temperature was then taken up to 60° C. during a further hour's working. The material was then allowed to cool to 30° C. while working was continued. It was then aged at 27° C. from 2 to 10 days, according to the viscosity required. The products were incompletely soluble in caustic soda at room temperature but 7% solutions could be formed in 7.5% caustic soda if the mixture was first cooled to +7° C. and then allowed to regain atmospheric temperature. The solution was of excellent quality.

By way of contrast with this example, the process was repeated except that the dimethyl sulfate was added in a thin stream. The product contained 5% methoxyl radical, formed a rather fibrous 7% solution in 7.5% caustic soda at —7° C., and was only about 70% soluble in an unlimited quantity of 10% caustic soda at ordinary temperature.

Example XIII

One hundred twenty-five (125) parts of dense wood pulp chips, as used in Example XI, were worked in a jacketed Werner-Pfleiderer machine with a solution of 45 parts caustic soda in 200 parts water at 20° C. for 8 hours, at the end of which period 18 parts of dimethyl sulfate were introduced in the form of a fine mist by means of an atomizer for a period of about 1 hour during which the incorporation was continued. From the commencement of the period of introduction of the dimethyl sulfate, the reaction mixture was continuously heated by the circulation of steam through the jacket so that a temperature of 50° C. was attained on the completion of this period, and the temperature was then taken up to 60° C. during a further hour's working. The material was then allowed to cool to 30° C. while working was continued. It was then aged at 27° C. from 2 to 10 days, according to the viscosity required. The product contained 4.1% methoxyl radicle, formed an excellent 7% solution in 7.5% caustic soda at —5° C., and was only about 30% soluble in an unlimited quantity of 10% caustic soda at ordinary temperature.

Example XIV

A solution of 36 parts caustic soda in 144 parts water at 20° C. was added to 100 parts disintegrated sulfite wood pulp contained in a Werner-Pfleiderer machine. After working had continued for 5 hours at this temperature, 13½ parts (0.198 mol. per glucose unit) glyceryl alpha-monochlorohydrin were introduced in the form of a fine mist by means of an atomizer over a period of 1½ hours, the working being continued during their introduction and for 2 hours more, the temperature being kept about 20° C. The product was then aged at 27° C., and was subsequently isolated by adding it to a large bulk of dilute sulfuric acid, washing the product until it was neutral, and then centrifuging it. It was incompletely soluble in caustic soda solution at room temperature, but dissolved completely when a suspension therein was frozen and slowly thawed.

Example XV

One hundred and twenty-five (125) parts of the dense wood pulp chips of U. S. A. Patent 2,067,946 (Picton) were added to a solution of 45 parts caustic soda in 180 parts water and worked for 8 hours at ordinary temperature as in Example XI. A solution of 12.1 parts ethylene chlorohydrin in 28.4 parts water was then sprayed in as a fine mist during a further working period of 2 hours. The subsequent steps of etherification, aging, precipitation, and washing were carried out as in Example XI. The product so obtained could be dissolved to form a 7% solution in 7.5% caustic soda solution cooled to +5° C., and the solution was smooth and free from fibers.

By way of contrast with this example, the process was repeated with the addition of the solution of ethylene chlorohydrin as a thin stream. On admixture of a quantity of the product with sufficient 7.5% caustic soda solution cooled to —7° C. to form a 7% solution of the product, a solution was formed which contained fibers and showed the irregular flow known in the manufacturing plant argot as "applesauce."

Example XVI

A solution of 33 parts caustic soda in 48 parts water cooled to 20° C. was added in a jacketed Werner-Pfleiderer machine to 60 parts of dense wood pulp chips, as used in Example XV. The material was worked for 16 hours, the temperature being maintained at about 20° C. by circulation of cold water through the jacket. At the end of this period, 16 parts (0.343 mol. per glucose unit) of dimethyl sulfate were introduced during a period of one hour in the form of a fine mist by means of an atomizer, the working of the machine and the circulation of the cold water being continued meantime. The product, which was incompletely soluble in dilute alkali, may be used for conversion into water-soluble ethers by further alkylation with an alkyl halide, such as methyl chloride or ethyl chloride, in known manner.

The invention is not limited to the specific etherifying agents mentioned in the examples, but is broadly applicable to those alkylating, hydroxy-alkylating and carboxy-alkylating agents which exist in liquid form, or which are vaporized with difficulty at room temperatures. Such reagents are difficult to introduce uniformly into a low substituted cellulose etherification mixture, as is well known to those skilled in the art. The procedure of this invention is especially adapted to the employment of etherifying agents having a boiling point above 60° C., because conventional etherification processes seldom give high quality products when these high boiling agents are used. The preferred group of etherifying agents employed in accordance with this invention consists of dimethyl sulfate, diethyl sulfate, sodium methyl sulfate, sodium ethyl sulfate, sodium methyl carbonate, ethylene chlorohydrin, propylene chlorohydrin, glycerin chlorohydrin, glycerin dichlorohydrin, epichlorohydrin, sodium chloroacetate, chloroacetic acid, and chloroacetamide. Etherifications with benzylating agents such as benzyl chloride may be carried out according to the procedures of this invention.

The liquid etherifying agents may be introduced with or without diluent. Unreactive organic solvents such as aromatic hydrocarbon liquids are preferred as diluents, since they do not interfere with the reaction, as, for example, by reducing the concentration of the caustic soda solution in the mixture. Benzene, dioxan and ethyl alcohol constitute a quite useful and preferred group of solvent materials. In some instances, as in the case of sodium chloroacetate, an aqueous solution must be used. Sometimes an emulsion of the etherifying agent in water gives satisfactory results. Solid etherifying agents may be used as solutions or melts.

The processes of this invention can be used for the manufacture of a wide variety of low substituted cellulose ethers. More particularly, four types of low substituted cellulose ethers are contemplated. The process is especially suitable for the preparation of (1) low substituted cellulose ethers which are dissolved by 6% aqueous caustic soda by chilling to low temperatures approximating the freezing point but which are not dissolved by the same solution at ordinary temperatures. This process is very useful for the preparation of (2) low substituted cellulose ethers having a degree of substitution which is insufficient to render them soluble in caustic alkalies even after cooling to the freezing point of the mixture, and is particularly suitable for the preparation of (3) low substituted cellulose ethers which are dissolved by aqueous caustic alkali solutions at room temperatures. The process is also of great value in the preparation of (4) low substituted water soluble cellulose ethers and low substituted cellulose ethers which contain radicals incapable of bringing about aqueous caustic alkali solubility even when etherification is carried out to a high degree. The process of this invention can be desirably used to produce cellulose ethers having up to 1.5 mols of substitution per glucose unit of the cellulose.

Ordinarily the water soluble low substituted cellulose ethers are etherified with the same radicals as the aqueous caustic alkali soluble type, but they have a higher degree of substitution. The process is considered to be especially applicable to the preparation of low substituted cellulose ethers of the aqueous caustic alkali soluble varieties mentioned above, not only because of the high quality of the product which is produced, but also because other advantages gained by the process appear to accrue to an unusual degree in the preparation thereof.

The manufacture of alkali cellulose is a well known process and probably needs no explanation here, but for the sake of completeness attention is directed to page 156 et. seq. of volume VII of the first edition of Technologie der Textilefasern.

The alkali cellulose used in the processes of this invention is preferably in a finely divided form such as results from the shredding of cellulose (which has been steeped in sodium hydroxide) through the action of a Werner-Pfleiderer shredder. A convenient and satisfactory method of preparing the alkali cellulose is to steep wood pulp sheets in sodium hydroxide solution of mercerizing strength, press the steeped sheets to remove the excess mercerizing solution, and shred the pressed product. Another preferred form of starting cellulose is that utilized in Example XV.

The processes may also satisfactorily employ finely divided alkali cellulose made by mixing sodium hydroxide solutions with cellulose in a shredder. Advantages are also gained by applying the processes of this invention to alkali cellulose in the form of sheets or webs.

Superficial etherification of textiles is an expedient often resorted to in the finishing industry, and the processes of this invention are admirably suited for such purposes. The heretofore known procedures in this field involved passing the textile through a bath of the etherifying agent, with the result that optimum results were generally not obtained. Bath treatments usually cause full saturation of the fibrous material and consequent etherification in the interior of the fiber. The advantages of the present process in this field will be obvious, since the cellulose in sheeted or woven form can be passed in a continuous manner through a chamber containing the etherifying agent in a fine mist. Obviously threads and unwoven fibers can be treated in the same way.

A wide variety of apparatus can be employed in the processes of the present invention. Where aqueous caustic alkali soluble low substituted cellulose ethers are being prepared, a shredder is particularly suitable, since the etherification can be carried out in the same machine which is used for the shredding of the alkali cellulose. It is desirable in the manufacture of this type of product that the alkali cellulose be thoroughly agitated during the addition of the etherifying agent. The reaction may also be carried out in a simple tumbling device, such as a barratte (churn), of the type commonly used in the viscose industry. With previously known etherification procedures, it has been practically impossible to prepare low substituted cellulose ethers of good quality with etherification reagents of the type employed in this invention, using as simple a reaction vessel as a churn. From the point of view of the economies obtainable with such a piece of apparatus, the advance in the art made by the present invention is quite distinct.

The etherification reaction may also be carried out in any other reaction vessel equipped with a means of agitating the reaction mixture during the addition of the etherifying agent in mist form. Mixers of the Werner-Pfleiderer shredder type are generally preferred because of the thorough agitation they provide.

The conditions (such as temperature and pressure) used for the etherification reaction are generally the same as those in conventional procedures. In the interest of brevity attention is directed to U. S. A. Patents No. 2,060,056, 2,123,883, 2,134,086 and 2,157,530, for such details.

In most cases the etherifying agent is introduced at temperatures close to room temperature, but this may be varied to accommodate other details of the process. The conditions for the introduction of the reagent can be varied over wide limits, as will be apparent from the description of the procedures set out elsewhere in this specification.

The reaction is preferably carried out in the absence of a diluent other than that introduced with the etherifying agent. The possibility of effecting the reaction without a diluent constitutes an important advantage of the present invention, for the reason, inter alia, that the handling and purifying of the final product is much more simple when it is not in the form of a slurry or a solution.

Purification of the reaction mixture of this invention is often markedly simplified (compared with corresponding prior art cellulose ether reaction mixtures) because of the smaller quantity of reagents necessary to make the product. This results in a lower proportion of by-products. Furthermore, the improved characteristics of the low substituted cellulose ethers of this invention are such as to facilitate handling.

It is not necessary that the etherification commence during the addition of the etherifying agent, and as a matter of fact, excellent results have been obtained when the etherification reaction was postponed until the addition of the etherification agent was complete. This is particularly true in the manufacture of very low substituted cellulose ethers. In some instances, particularly where cellulose ethers of higher degrees of substitution are being made, the etherifying agent may advantageously be added in steps. Thus, for example, one-quarter of the reagent may be added and allowed to react, after which another quarter is added and allowed to react, and these steps repeated until all of the reagent has been introduced.

The etherification mixture may be removed from the shredder at any time after the addition of the desired amount of the reagent.

The expression "low substituted cellulose ether" is used in the art to describe cellulose ethers having up to about one mol of substitution per glucose unit of the cellulose. Most of the low substituted cellulose ethers produced contain less than this amount of substitution.

The word "spray" in this specification is not used broadly to cover jets of liquid particles regardless of size. The term is, in accordance with a somewhat technical usage, employed as a synonym for "atomize".

The term "mist" used in this application to define the material or the physical form of the material being sprayed or atomized on to the alkali cellulose, may in the interest of exact definition be defined as being formed of discontinuous droplets of liquid, most of which have a diameter not in excess of 200 microns (0.2 mm.) and preferably not in excess of 100 microns (0.1 mm.). The best results are obtained when the particles are so fine as to form a mist or cloud of droplets, the greater part of which falls under the influence of gravity at a rate of, or not substantially exceeding, 2 feet per second, and preferably not in excess of 1 foot per second. There are several makes of misting or atomizing nozzles on the market which can be conveniently used for producing such a product. Ordinarily a pressure of 35 pounds per square inch on the liquid being atomized produces satisfactory results.

The process of this invention permits the production of cellulose ethers of the low substituted variety of good solubility at a lower degree of substitution than can be obtained by conventional methods. A methyl cellulose manufactured in accordance with this invention and containing 0.25 mol of methyl substituent per glucose unit of the cellulose will be of better solubility in 10% sodium hydroxide in the cold than a methyl cellulose of higher degree of methylation made by mixing liquid dimethyl sulfate in unatomized form with loose soda cellulose in a shredder. It will be apparent, therefore, that the present invention not only effects a saving in reagent, but that it produces cellulose ethers of better quality.

The resistance to water exhibited by a cellulose ether is an important characteristic, particularly where the cellulose ether is to be used as a textile size. This resistance decreases as the average degree of substitution is increased. It follows that at the lower average degrees of substitution which can be achieved by the present process, ethers of superior water resistance are obtained.

Another important advantage of the present invention is that it permits production of cellulose ethers in much simpler equipment than is required by conventional processes. The shredded alkali cellulose can be placed in a rotating barrel and the etherifying agent sprayed into the mixture in the form of a fine mist. Only such agitation as results from the tumbling which takes place as the barrel is rotated, is necessary. The use of such devices is advantageous because of the low cost of operation. When liquid etherifying agents are introduced into alkali cellulose in the form of a large mass of liquid or in the form of a stream, a powerful mixing device, such as a Werner-Pfleiderer shredder, cannot be avoided.

As many apparently widely different embodiments of this invention may be made without departing from the spirit and scope thereof, it is to be understood that this invention is not limited to the specific embodiments thereof except as defined in the appended claims.

I claim:
1. The process which comprises steeping 120 parts of wood pulp cellulose in 1200 parts of 21% aqueous sodium hydroxide and pressing to 300 parts, shredding the resultant alkali cellulose, tumbling the shredded material while adding 51 parts of dimethyl sulfate in the form of a mist over a period of 30 minutes, continuing the tumbling for 1¼ hours, aging the resultant at 30° C. for 16 hours, and therafter washing free from alkali.

2. The process of preparing cellulose ethers which comprises treating cellulose with caustic alkali in the presence of water to form alkali cellulose, treating the alkali cellulose at room temperature with an etherifying agent mist to form the cellulose ether, the amount of etherifying reagent contacted with the cellulose being sufficient to produce a cellulose ether of 0.045 mols of substitution but insufficient to produce a cellulose ether of more than 1.5 mols of substitution.

3. The process of preparing methyl cellulose which comprises treating cellulose with caustic soda in the presence of water, treating the soda cellulose at room temperature with dimethyl sulfate mist to form methyl cellulose, the amount of dimethyl sulfate contacting the cellulose being in the range 0.05 to 0.546 mols per glucose unit of the cellulose.

COLE COOLIDGE.